J. C. FULLER.
APPARATUS FOR INDICATING THE HEIGHT OF WATER IN RECEPTACLES.
APPLICATION FILED MAR. 18, 1918.
1,367,689.
Patented Feb. 8, 1921.
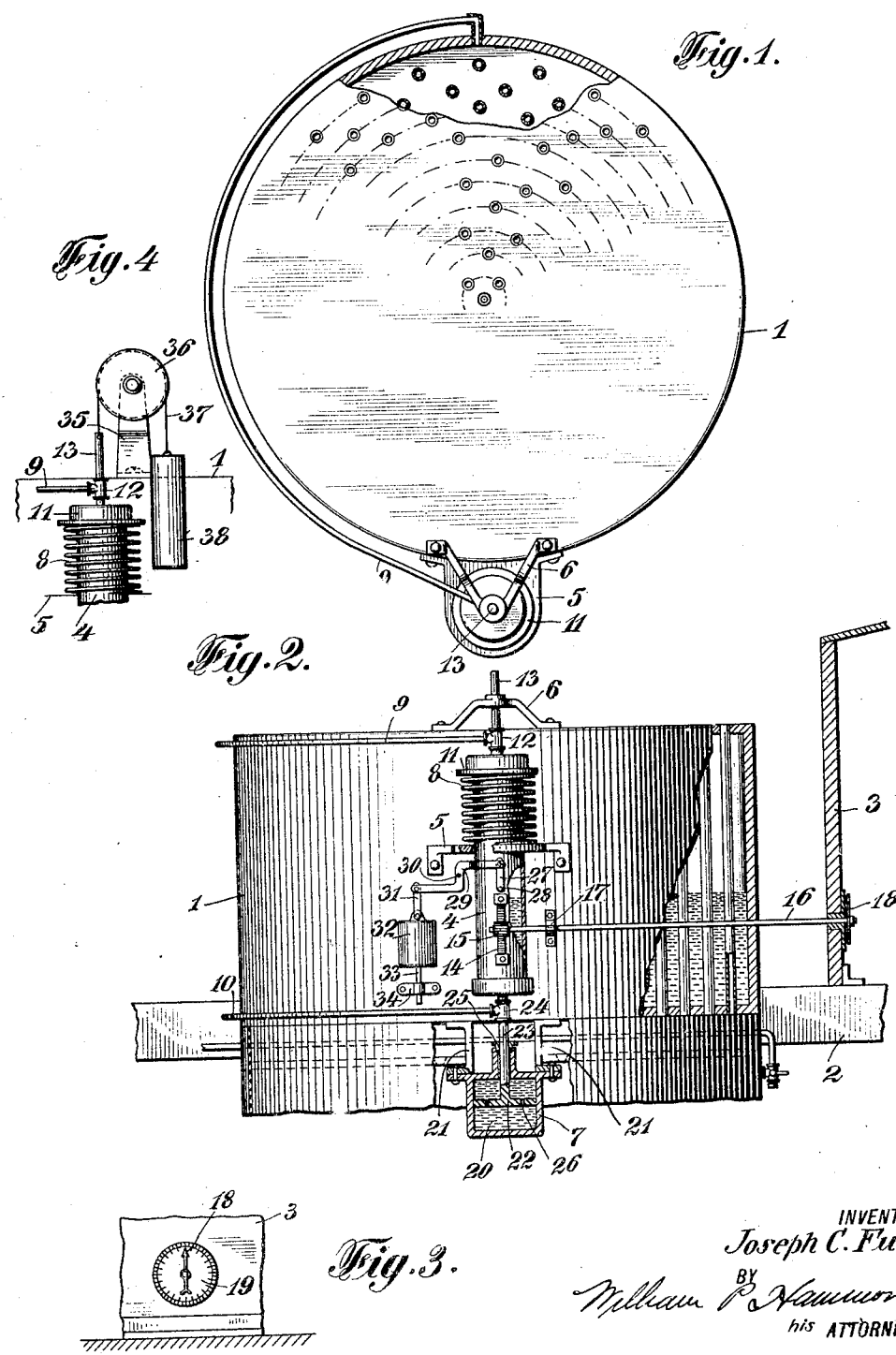
INVENTOR
Joseph C. Fuller
BY
William P. Hammond
his ATTORNEY

UNITED STATES PATENT OFFICE.

JOSEPH C. FULLER, OF SEWAREN, NEW JERSEY.

APPARATUS FOR INDICATING THE HEIGHT OF WATER IN RECEPTACLES.

1,367,689.  Specification of Letters Patent.  Patented Feb. 8, 1921.

Application filed March 18, 1918. Serial No. 223,083.

*To all whom it may concern:*

Be it known that I, JOSEPH C. FULLER, a citizen of the United States, residing in Sewaren, New Jersey, have invented certain new and useful Improvements in Apparatus for Indicating the Height of Water in Receptacles, of which the following is a specification.

My present invention relates more particularly to an indicating apparatus which is capable of being used in connection with liquid receiving receptacles which are subjected to vibration as for instance the boiler of a steam propelled vehicle, although I do not wish to be restricted to such use.

The object of my invention is to provide an apparatus that will indicate and be sensitive and responsive to slight variations in the level of the water in the boiler and at the same time be unaffected by vibration incident to the running of the vehicle.

In the accompanying sheet of drawings, I have illustrated a preferable embodiment of the principles of my invention by way of example, and I have shown the invention as applied to the boiler of a steam propelled road vehicle.

Figure 1 is a top plan view of said embodiment, the indicating apparatus and steam boiler only appearing.

Fig. 2 is a view in side elevation partly sectioned to illustrate details together with a fragmentary portion of the vehicle.

Fig. 3 is a fragmentary portion of the dash of the vehicle to which has been applied the gage dial and indicating hand.

Fig. 4 is a view in side elevation of a modification.

The steam boiler 1 is of the conventional type and is mounted upon the chassis of the machine, one side bar of which is indicated at 2. 3 indicates the vehicle dash. When used in connection with a steam propelled automobile where the steam boiler is concealed, it is desirable to arrange the apparatus so that the water condition obtaining within the boiler and as indicated by the gage is observable from the seat of the driver. I, therefore, position the graduated dial and indicating hand upon the dash in full sight of the operator, while the other gage instrumentalities are located in proximity to and are preferably carried by the boiler.

The gaging instrumentalities comprise a weighing cylinder 4 supported in position adjacent the boiler 1 by suitable brackets 5 and 6, and a dash pot 7. The weighing cylinder 4 is yieldingly mounted upon a calibrated spring 8 and has communication with the interior of the boiler by means of the pipes 9 and 10, which pipes are of sufficient length to extend around the boiler to a point diametrically opposite the position of the weighing cylinder. The pipes 9 and 10 by reason of their length flex readily and avoid exerting any appreciable restraint against the free vertical movement of the weighing cylinder under conditions of operation. The calibrated spring 8 surrounds the weighing cylinder 4 and is interposed between the bracket 5, which is made fast to the exterior of the boiler 1 and a flange 11 formed on the top cap of the cylinder 4, so that the weight of the cylinder and its contents will be carried by the spring, the whole exerting a compressive tension thereagainst. Extending from a union 12, which affords communication between the pipe 9 and cylinder 4 is a guide rod 13 loosely fitting within the bracket 6, which is riveted or otherwise secured to the boiler, forming an alining means which confines the movement of the weighing cylinder to the vertical.

It will be understood from the description thus far that the water supplied to the boiler 1 will flow without restraint through pipe 10 into the weighing cylinder 4 and will rise therein to an equal level causing the weighing cylinder to descend against the tension of the calibrated spring 8. In order to indicate the level of the water entering the weighing cylinder 4, and hence the level of the water within the boiler 1, the following instrumentalities are used. Upon the side of the weighing cylinder 4 is arranged a rack 14, coöperating with the rack is a pinion 15 mounted upon a shaft 16, the latter being guided by a bearing 17. This shaft extends through the dash 3 of the vehicle and has mounted upon its extremity an indicating hand 18, which coöperates with a dial 19 which is suitably graduated. It will be obvious that as the weighing cylinder 4 moves in either direction, this motion is communicated to the hand 18 causing the latter to vary accordingly upon the dial. By suitably proportioning the parts such as increasing the size of the pinion 15, the extent of movement of the hand 18 over the dial can be governed.

As the illustrated and described use of my invention is in connection with an automobile, wherein the boiler is subjected to considerable lateral vibration incident to the longitudinal travel of the vehicle, I find it desirable to provide an absorbing means for counteracting and minimizing any vibration which might otherwise be transmitted to the weighing cylinder and which would if present cause an inaccurate indication or wavering of the indicating hand. One way of accomplishing this desirable result is by using the dash pot 7. This dash pot may consist of a housing containing a viscous fluid 20 and may be supported by suitable brackets 21 depending from the boiler. Within the housing is a piston 22 having a rod 23 extending therefrom which is connected by union 24 to the weighing cylinder 4, a suitable stuffing box 25 being employed to effect a leak tight connection. The piston 22 is provided with ports 26 to permit the flow of the liquid from one side to the other during its reciprocal movement. It is manifest that this dash pot will exert a restraint upon and prevent abrupt movement of the weighing cylinder 4 which would otherwise tend to mitigate against the accuracy of the device as a whole.

To make more sensitive and accurate the gaging of the quantity of liquid, I may employ a counterweight normally neutralizing the weight of the weighing cylinder so that a calibrated spring of greater sensitiveness may be employed, the spring being capable of movement under slighter differences in liquid levels within the boiler 1 than otherwise, thus making the indicating portion of the gage correspondingly sensitive to minuter variable conditions. One means of accomplishing this result consists in using a link 27 pivoted to the weighing cylinder 4 at 28, to which link is connected a lever 29 pivotedly supported at 30, the opposite extremity of this lever is connected to a link 31 which supports a counterweight 32, having a projecting extremity 33 guided in a guide-bearing 34.

Other means for accomplishing the same purpose is illustrated in Fig. 4, in which I have shown my bracket 35 extending upwardly above the boiler 1 upon which is mounted a pulley 36, one end of a flexible cable 37 is fastened to the extremity of the guide rod 13, while its other extremity is fastened to a counter-weight 38. The cable operating over the pulley 36 in a manner thought to be well understood. In each instance the counterweight is approximately equal to the weight of the cylinder so that the spring will support only the weight of the liquid.

While all of the principles of my invention have been illustrated and described in a single embodiment in connection with a receptacle which is subjected to vibration, certain features of the invention may be applied to stationary liquid containers or receptacles to advantage in which case I may dispense with the dash pot and the counter-weight entirely, if I so desire.

Having thus described my invention what I claim as new herein and desire to secure by Letters Patent is:

1. The combination with a liquid receptacle, of a liquid level gage including a weighing container mounted for vertical movement at one side of the receptacle and in communication therewith, a yieldable support for the container, stems projecting longitudinally from opposite ends of the container, guide brackets slidably engaging the stems, and a dash pot operatively connected to the other stems to absorb any vibrations of the weighing container.

2. The combination with the steam boiler of a steam propelled vehicle having a dash board, of a liquid level gage including a weighing container mounted for vertical movement at one side of the boiler and in communication therewith, a yieldable support for the weighing container, an indicator mounted upon the vehicle dash board, and a shaft extending between the dash board and the boiler and operatively connected at its respective ends with the weighing container and indicator.

3. The combination with a liquid receptacle, of a liquid level gage including a weighing container mounted for vertical movement at one side of the receptacle, tubular stems projecting longitudinally from opposite ends of the container, flexible pipe connections between the respective tubular stems and the receptacle, guide brackets slidably engaging the tubular stems, a yieldable support for the container, and indicating means operated by the movements of the container.

4. The combination with a liquid receptacle, of a liquid level gage including a weighing container mounted for vertical movement at one side of the receptacle, a yieldable support for the container, tubular stems projecting longitudinally from opposite ends of the container, flexible tubes establishing communication between the respective tubular stems and the receptacle, guide brackets slidably engaging the tubular stems, a dash-pot operatively connected to one of the tubular stems to absorb any vibrations of the container, and indicating means actuated by the movements of the container.

5. The combination with a liquid receptacle, of a liquid level gage including a weighing container mounted for vertical movement at one side of the receptacle and in communication therewith, said container being formed with a flange, a bearing plate loosely receiving the container, a coil spring surrounding the container and interposed between the flange thereof and the bearing plate, stems projecting from the ends of the container, guide brackets engaging the stems, and indicating means operatively connected to the container.

6. The combination with a liquid receptacle, of a liquid level gage including a weighing container mounted for vertical movement at one side of the receptacle and in communication therewith, said container being formed with a flange, a bearing plate formed with an opening loosely receiving the container, a coil spring surrounding the container and interposed between the flange and the bearing plate, stems projecting longitudinally from the opposite ends of the container, guide brackets slidably engaging the stems, vibration absorbing means operatively connected to one of the stems, and indicating means actuated by the movements of the container.

JOSEPH C. FULLER.